United States Patent [19]

Quintille

[11] Patent Number: 4,903,546
[45] Date of Patent: Feb. 27, 1990

[54] TRANSMISSION HOUSING WITH A BRAKE ATTACHED

[75] Inventor: Mark Quintille, Brunswick, Ohio

[73] Assignee: MTD Products Inc., Ohio

[21] Appl. No.: 209,922

[22] Filed: Jun. 22, 1988

[51] Int. Cl.⁴ .................. F16H 57/02; F16H 57/10
[52] U.S. Cl. ........................ 74/606 R; 74/411.5; 403/337; 403/21
[58] Field of Search ........ 74/606 R, 607, 701, 74/411.5; 403/337, 336, 21, 22; 188/18 A; 192/70.13; 411/104, 169, 400

[56] References Cited

U.S. PATENT DOCUMENTS

| | | | |
|---|---|---|---|
| 1,813,524 | 7/1931 | Astrup | 74/606 R |
| 2,748,906 | 6/1956 | Flora | 411/970 |
| 3,447,399 | 6/1969 | Hungerford | 74/701 |
| 4,103,566 | 8/1978 | von Kaler | 74/701 |
| 4,449,424 | 5/1984 | Hauser | 74/606 R |
| 4,633,979 | 1/1987 | Edwards | 188/72.7 |
| 4,727,768 | 3/1988 | Hayashi | 74/606 R |
| 4,758,109 | 7/1988 | Little | 403/21 |

Primary Examiner—Gary L. Smith
Assistant Examiner—F. Saether
Attorney, Agent, or Firm—Woodling, Krost and Rust

[57] ABSTRACT

An improved transmission housing is disclosed utilizing slots in mirror image housing castings to mount bolts that retain the brake to the transmission housing without the necessity of any machining. The axis of the slots extend substantially perpendicular to the parting line of the housing castings with the enlarged heads of the bolts located therein so that the bolts cannot be rotated.

15 Claims, 4 Drawing Sheets

TRANSMISSION HOUSING WITH A BRAKE ATTACHED

This invention relates to an improved transmission.

Transmissions are a common way of selectively connecting an engine with a propulsion means. Garden tractors are devices that include a transmission between an engine and ground engaging wheels. The typical transmission for a garden tractor has multi-speeds forward, single speed reverse gearing in a die cast housing. The housing itself is formed of many separately manufactured unique parts. The parts mounted on the housing (for example the shift lever, input shaft, brake, etc.) have specific locations designed into the housing. While the typical transmissions work, the multiple unique parts and specific designed in locations of the transmissions parts reduce the utility of the transmissions while also adding significantly to the manufacturing, use and repair costs for such transmissions.

It is an object of this invention to reduce the number of unique parts in a transmission.

It is an object of this invention to increase the utility of transmissions.

It is an object of this invention to lower the cost of transmissions.

It is an object of this invention to increase the strength of transmissions.

It is an object of this invention to facilitate the mounting of parts onto a transmission.

Other objects and a more complete understanding of the invention may be had by referred to the drawings in which:

DRAWINGS

PREFERRED EMBODIMENT OF THE INVENTION

This invention relates to an improved transmission 10. This transmission 10 includes a housing 11, a brake assembly 12 and an internal gear drive mechanism 13.

Figure 1:
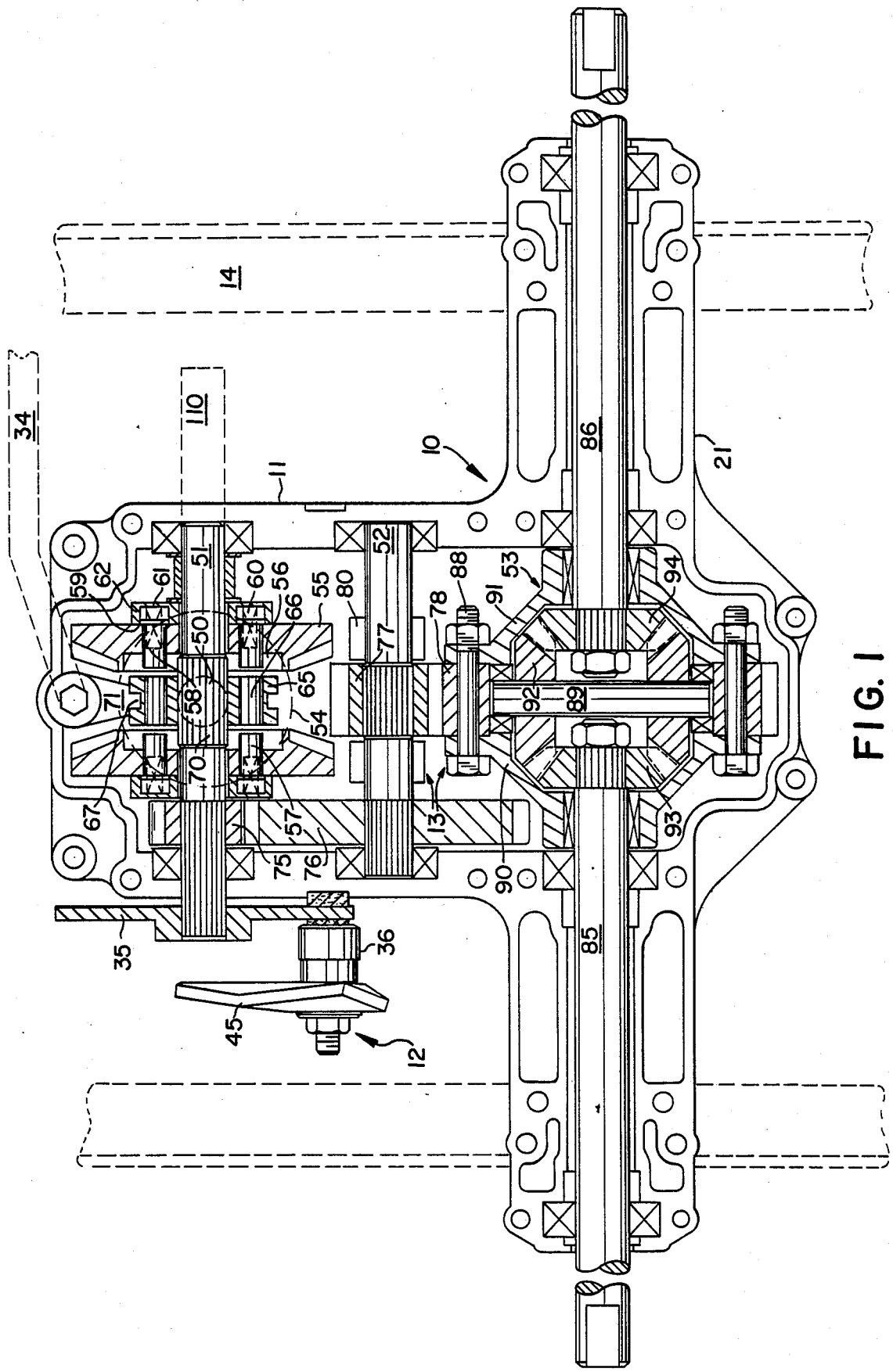
FIG. 1 is a lateral cross-sectional view of a transmission incorporating the invention the application.
Figure 2:
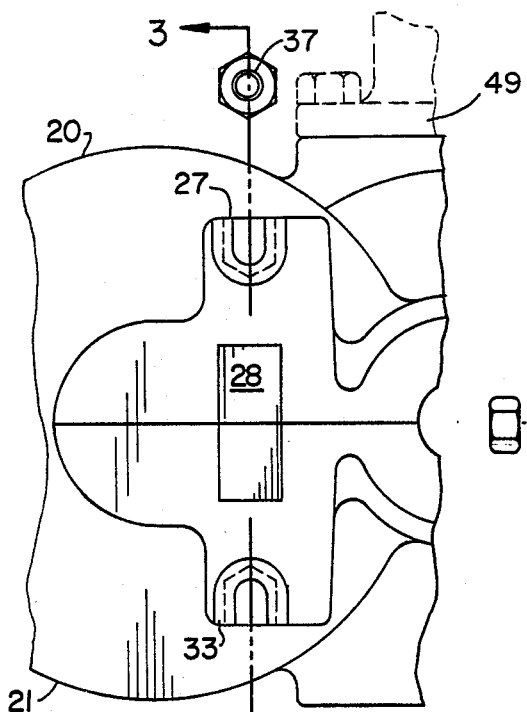
FIG. 2 is a side view of the brake mounting section of the transmission housing of FIG. 1 with the brake bolts in expanded position.
Figure 3:
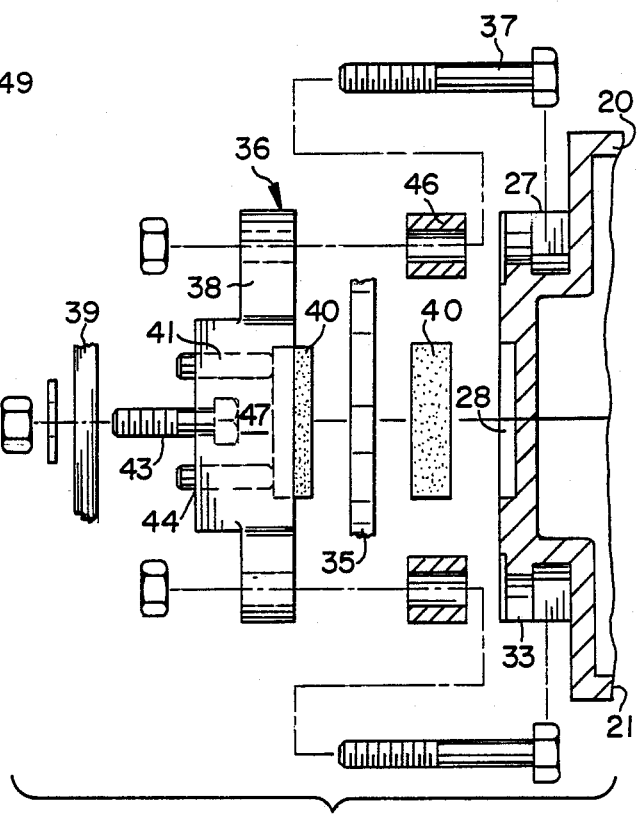
FIG. 3 is a cross-sectional view of the brake mounting section of FIG. 2 taken generally along lines 3—3 of that figure and including the brake assembly.
Figure 4:
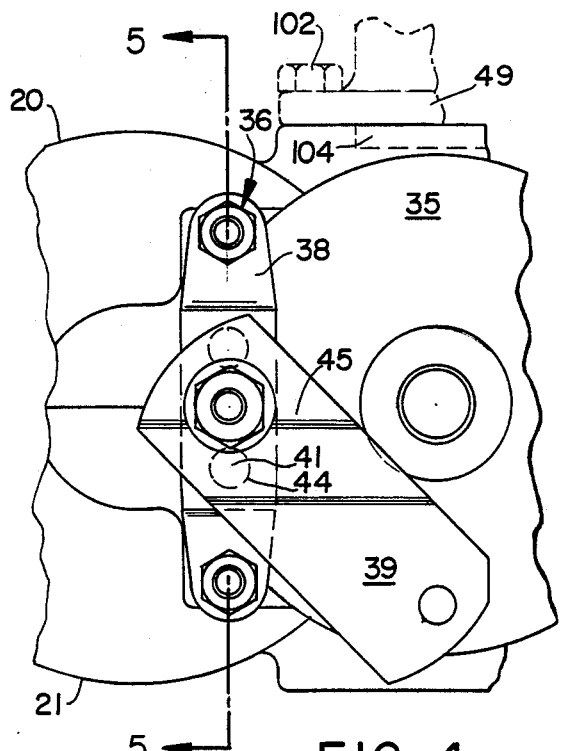
FIG. 4 is a side view of the brake mounting section of FIG. 2 with the brake assembly mounted to the housing.
Figure 5:
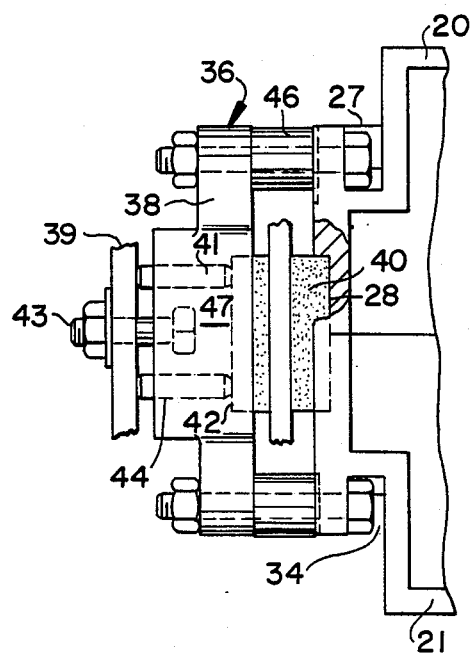
FIG. 5 is a cross-sectional view of FIG. 4 taken generally along lines 5—5 of that figure.
Figure 6:
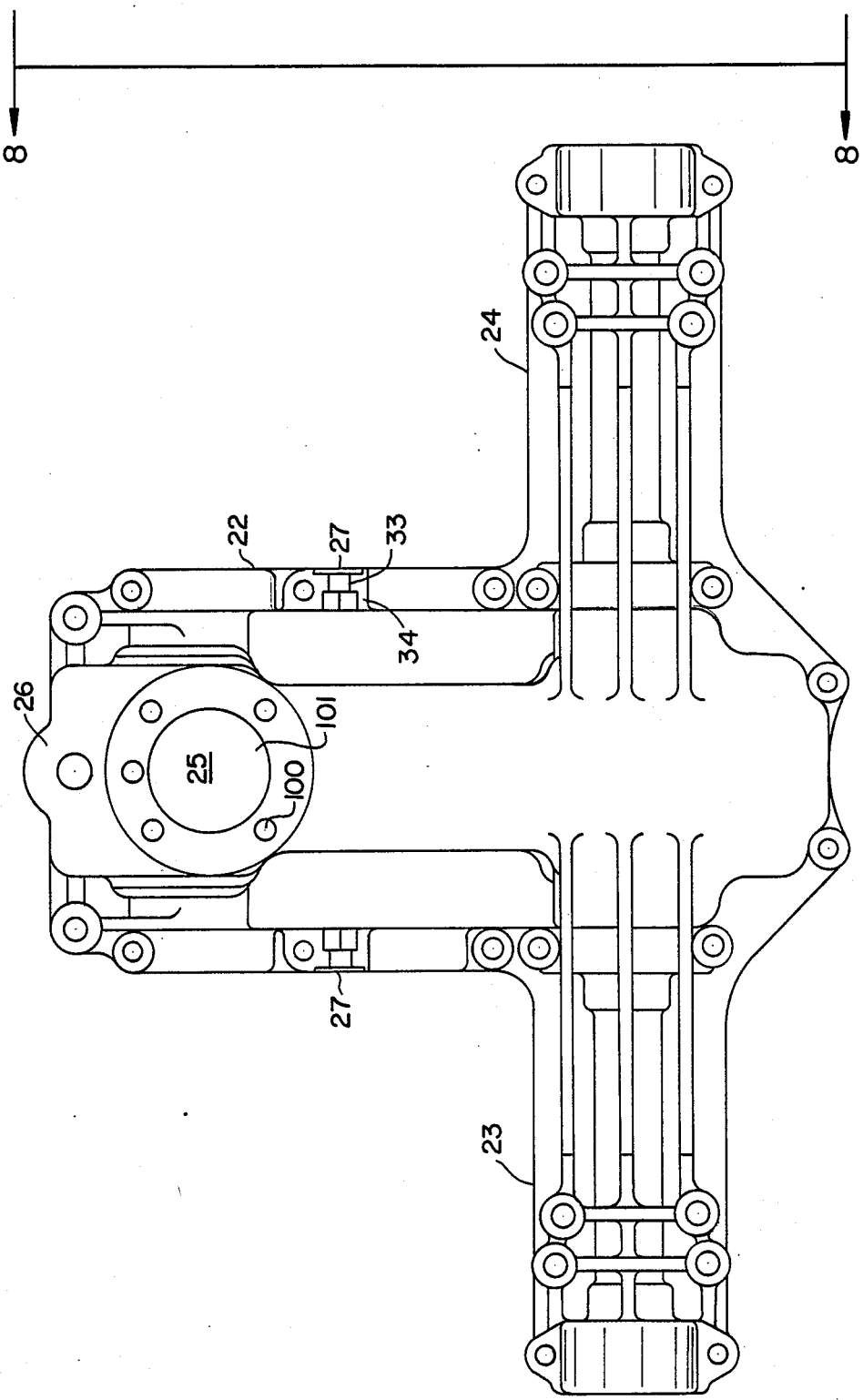
FIG. 6 is a top view of the transmission housing of FIG. 1.
Figure 7:
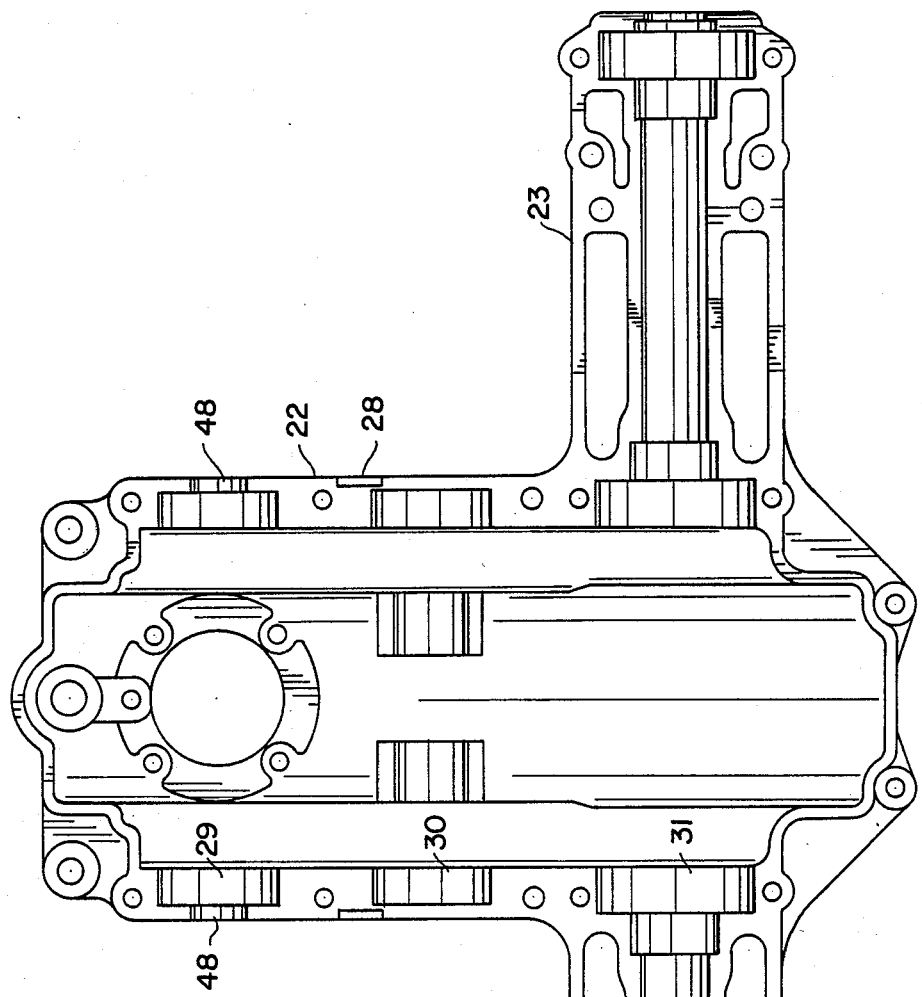
FIG. 7 is a bottom view of the transmission housing of FIG. 1.
Figure 8:
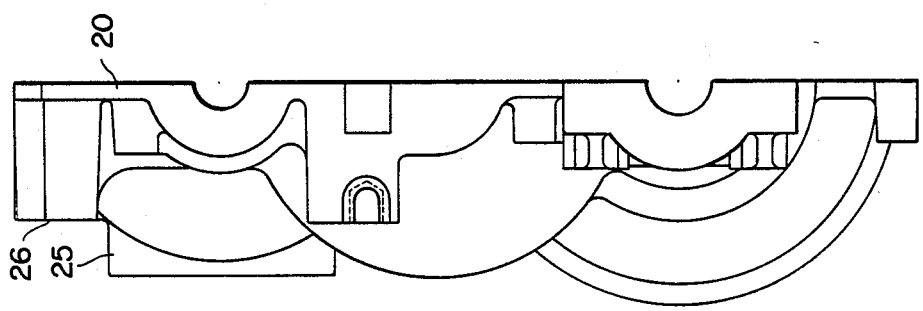
FIG. 8 is a side view of the transmission housing of FIG. 6 taken generally from lines 8—8 in that figure.

The transmission housing 11 is designed to retain the components of the transmission 10 into operational relationship with each other and with the associated garden tractor (part of the frame rails 14 of which are shown in dotted line in FIG. 1). The transmission housing 11 of the invention is constructed of two sections 20, 21. The sections 20, 21 themselves start out as two identical castings (FIGS. 6-8). Each casting includes a central section 22 and two laterally extending axle supports 23, 24. The central section 22 includes a vertical input mounting pad 25, a vertical shift lever shelf 26, brake mechanism mounting slots 27, a brake pad mounting groove 28, and three pairs of parallel shaft bearing journals 29, 30, 31. When the casting is manufactured, it is preferably manufactured in a generic form: anything not identical in both sections 20, 21 of the transmission housing 11 is not included in the casting. For example the transmission 10 disclosed is a vertical shaft upper section drive, left hand braked transmission with an upper, right hand shift lever. When cast there are four cored holes 100 circumferentially spaced about the input mounting pad 25. There is also a flash covering the center of the mounting pad 25 itself. To produce a vertical shaft input, the flash covering the center of the mounting pad 25 of the upper section 20 of the housing 11 is machined, preferably with a piloted bit, so as to create a relatively large diameter hole 101 in the center of the pad 25. The bevel gear input drive mounting piece 49 (dotted line in FIGS. 2 and 4) is then located onto the center of the pad 25 and bolted onto the housing 11 by self tapping screws 102 in the cored holes 100. It is preferred that the input drive mounting piece 49 have a downwardly extending cylindrical section 104 the diameter of the hole 101 in the pad 25 so as to accurately locate the piece 49 in respect to the housing 11 (and the gears contained therein). This relieves the screws 102 from all but mechanical attachment duties. If deemed appropriate a gasket or resilient material can be included between the mounting piece 49 and housing 11. (i.e. to compensate for casting irregularities, strengthen the connection, etc). Note that due to the casting of the cored holes 100 no machining other than the central hole 101 in the pad 25 is necessary to mount the bevel gear input mounting piece 49 (and if one was willing to utilize non-symmetrical castings even this central hole could have been cast to reduce the amount of machining even further.) To produce the left hand braked transmission as shown the input shaft 51 is extended out of the left sidewall of the transmission through the cast opening 48 outward of the bearing journals 29. (Note that since brake mechanism mounting slots 27 and pad grooves 28 are provided on both sides of the casting, no other manufacturing operation need occur on the casting for mounting the brake. The unused slots 27 and pad grooves 28 are left alone with no adverse consequences.) To provide the upper right hand shift lever the vertical shift lever shelf 26 of the lower section 21 of the housing 11 and the vertical shift lever shelf 26 of the upper section 21 are bored through (so as to avoid blind holes and eliminate concern for chips in the bottom of a blind hole). This allows the shift lever 34 to be rotatively mounted therein.

In the preferred embodiment shown, all of the parts of the casting are designed to be cast in, preferably without multi-piece molds. For example, the brake mechanism mounting slots 27 and holes extend generally perpendicular to the parting line of the casting. The slots 27 and holes therefore can be inherently produced in their entirety without operations additional to that which would occur in producing a transmission casting without the slots 27 or holes. This significantly lowers the cost of the slots or other particular item cast. By changing what is selectively machined, drilled or extended other totally different configurations may be produced. For example—eliminating the drilling of a center hole 101 in the vertical input mounting pad 25 of the upper section 20 of the housing 11 (i.e. leaving the flash) and extending a lengthened input shaft 51 out of the housing 11 to the right (i.e. opposite to the brake as shown in dotted line 110 in FIG. 1) a horizontal input for the transmission 10 would be created (for a reduction drive or forward/reverse transmission as later described). As the cast opening 48 for such lengthened shaft is already present in the housing 11 no other operation is needed. (The bevel input gear 50 and other gear components later described would be eliminated as being redundant.) Further example—by extending the input shaft 51 out of the right instead of left side of the housing 11 the brake could be mounted on the right side instead of the left (or two brakes could be mounted on a lengthened shaft). Other variations are also possible. For example, by mounting a right angle drive on the drilled mounting pad 25 a shaft driven transmission can be produced. Note that the parallel shaft bearing journals 29, 30 and 31 are not effected by these variations—i.e. lengthening the shafts otherwise present in these journals to extend from the housing does not substantially alter the bearing journals. This is especially so for shafts such as 51 that have openings 48 already present cast into the housing 11. The other shafts could also have openings if desired. Note that if it is desired, the unused openings in the castings off of the end of a shaft could be selectively sealed, as for example by a plastic plug. This would further seal the housing against leakage out and contamination in.

The brake assembly 12 is designed to slow the output of the transmission 10. The brake assembly 12 of the preferred embodiment of the invention is a disk brake unit having a brake disk 35, and an actuation assembly 36.

The brake disk 35 is a generally circular steel disk mounted onto a shaft of the transmission 10 for rotation therewith. The shaft braked in the transmission is preferably a high speed low torque shaft, the input shaft 51 in the example transmission.

The actuation assembly 36 includes two "T" bolts 37, a mounting block 38, an actuation lever 39, two brake pads 40 and two actuation pins 41. The mounting block 38 for the brake is fixedly bolted to the housing 11 of the transmission 10 by the "T" bolts 37. Two spacers 46 space the mounting block 38 from the housing 11. The heads of the "T" bolts 37 are within the brake mounting slots 27 to firmly connect such bolts 37 to the two sections 20, 21 of the housing 11. The slot 27 has a width slightly greater than the diameter of the body of bolt 37 (later described) that is to be used therewith and an opening to the slot greater than the diameter of the head of such bolt 37. In the preferred embodiment shown, bolt 37 is a ¼" hex head bolt having a ⅜" head (across flats). The respective dimensions of the slots 27 are greater than these dimensions. Note that the depth of the slot 27 is an important dimension; too shallow a slot 27 will not provide the needed strength against failure due to manufacturing forces (tightening the bolts 37) or operational forces (braking torque). In the preferred embodiment the slots 27 have ⅜" of material between the head of the bolt 37 and the outside surface of the casting. This depth of material securely mounts the bolt 37.

The strength of the slot mounting described is in excess of that technically needed. In particular in the embodiment described the bolts 37 are grade 5 bolts having an available head area of approximately 0.0548 square inches for contact with the housing 11 on the inside of the slots 27. These bolts 37 are preloaded to 0.75 percent of their 85KSI proof load resulting in a 2000 pound static preload clamping force between the head of the bolts 37 and the spacer 46 (preload torque 100 inch pounds on the bolt). The effective force on the bolt 37 during application the brake is determined by the following formulas:

Effective force on one side =

$$\text{clamping force} + \frac{K_B}{K_{AL} + K_B} \text{(External Load)} \text{ and}$$

Effective force on the other side =

$$\text{clamping force} - \frac{K_B}{K_B + \frac{K_{AL}}{la}} \text{(External Load)}$$

Where $K_B$ equals the area of the minor diameter of the bolt times a constant E for the bolt all over the effective length of the bolt while $K_{AL}$ equals the area of the housing in contact with the bolt head times a constant $E_{AL}$ for the housing material all over the thickness LA of the housing. Plugging in the values of the preferred embodiment $K_B$ equals (0.0314 in 2 times $30 \times 10^6$ lb./in2/1.1 in) or $856 \times 10^3$ lb./in. and $K_{AL}$ equals (0.0548 in2 times $10 \times 10^6$)/ LA or $548 \times 10^3$/LA. In our example brake 500 pounds of breaking force on the brake disk 35 are created by the application of 35 pounds of force on the lever 39. Therefore for a wall thickness of 0.2 the effective force on one side of the housing (the inside of the slot) is 2120 pounds under external braking load while the effective force on the other side of the housing (the outside of the slot) is 1880 pounds. (This effective force on the outer lip 33 of the slot is increased (or reduced respectively) by substantially ten pounds for each 0.025 change in wall thickness.) The difference in effective forces on the opposing sides of the slot translated into about 240 pounds of side load on the outer lip walls of the slot 27 (2120−1880lbs) about the 2000 pound preload baseline on application of the brake. The walls of the outer lip of the slot 27 must be strong enough to handle this 240 pound sideload. The size of the bolt head in shear contact with the housing 11 for the bolt 37 utilized in the preferred embodiment is approximately 0.423.1416 inches. Inserting the 240 pound side load and the 0.423.1416 area of the bolt head into the shear formula minimum thickness of the wall equals applied load over the size of the bolt head times the constant E for the housing one determines that the minimum thickness of the slot wall between the head of the bolt 37 and the spacer 46 to withstand the shearing sideload for the preferred aluminum housing equals 240 lbs./423.1416 times $30 \times 10^3$ lb/in2 or 0.006 inches. In addition to shearing forces on the outer lip 33 of the slot 27 the thickness of the wall 34 of the housing 11 alongside the bolt head connecting the outer lip 33 of the slot 27 to the housing must withstand the pull of the bolt head away from the housing 11. This thickness is determined by the formula of the yield strength for the housing material equals the effective force on the wall over the length of the wall times thickness of the wall. Substituting the 500 pound braking force and a 24,000 PSI constant into the thickness formula one determines the minimum thickness of wall 34 to be equal to 24,000 PSI=250/0.32 thickness or 0.0325 inches. These dimensions (0.006 and 0.0325) are surprisingly small. It is referred that for a given bolt diameter that the thickness of the slot wall between the bolt head and spacer 46 be within the range 0.7 to 1.5T, that the thickness of the housing wall beside the bolt head be within the range 1.5 to 2T and that the width of the slot lip be within the range 1 to 1.5T. These dimensions can be provided by outright wall dimensions or equivalently through e use of reinforcing arcs, buttresses, etc. These preferred dimensions will retain the brake on the housing wall during even unusual or severe conditions (such as when the bolts 37 loosen or a particular casting is weak)-not to mention providing psychic security to the user of the devices ("thick is strong"). They are therefore preferred over the mathematical dimensions.

Note that since these slots 27 are cast into the casting of the transmission, no machining or other secondary operation is needed to the housing 11 before the brake can be mounted thereto. In addition the use of cast slots instead of a machined hole makes alignment and manufacturing tolerances less of a concern as the bolt 37 will be self-aligning.

The inside brake pad 40 is pressed into the pad mounting groove 28 in the housing 11 and the outside brake pad 40 is mounted within a similar mounting groove 42 in the mounting block 38. The brake disk 35 is located between the brake pads 40. The actuation lever 39 is rotatively mounted to the mounting block 38 (by another T-bolt 43 inserted from the back of the mounting block 38 into a hole 47 in such block). The actuation pins 41 are trapped in holes 44 in the mounting block 38 between the actuation lever 39 and the outside brake pad 40. The actuation lever 39 has an angled section 45 (FIGS. 1 and 4) such that on rotation of the actuation lever 39 the pins 41 are pressed into the mounting block 38 against the back of the outside brake pad 40 and thus applies the brake. On release of the actuation lever 39, the pins 41 release slightly to allow the brake disk 35 to rotate freely once again. Note that since the casting of the housing 11 has slots 27 cast into both sides, the actuation assembly 36 can be mounted to either side (or both sides) of the housing 11.

The internal gear drive mechanism 13 is the operative connection between the engine and the ground engaging propulsion means for the vehicle. In the preferred embodiment disclosed this mechanism includes a bevel input 50, an input shaft 51, an intermediate shaft 52 and a differential axle assembly 53.

The bevel input 50 (dotted lines in FIG. 1) is the external drive connection between the transmission 10 and the engine (not shown) in the preferred embodiment shown. The bevel input 50 is journaled in a mounting piece 49 separately bolted to the vertical input mounting pad 25 of the upper section 20 of the housing 11. The shaft of the bevel input 50 protrudes upwardly of the mounting piece 49 for the mounting of a pulley, gear, clutch, or other drive connection to the engine. (If desired an input like 50 could have been mounted instead/in addition in the lower section 21 of the housing for a substitute downward drive connection, or supplementary input/output. A bevel gear 54 (dotted lines in FIG. 1) extends downwardly of the mounting piece 49 for extension through the center of the mounting pad 25 into the interior of the housing 11.

The input shaft 51 is the first of the three parallel shafts for the transmission. This shaft 51 is customarily the shift shaft for the transmission. In the embodiment shown there are two bevel gears 55 rotatively mounted to the input shaft 51. These gears 55 are in driving relationship with the input bevel gear 54 of the input 50 such that rotation of the input 50 rotates the two gears 55 in opposite directions on the input shaft 51. Each of the bevel gears 55 have a central shift collar pocket 56 on their inner surface. This pocket 56 allows an increased axial travel for the shift collar 65 (later described). This increased axial travel provides for a greater distance between forward, neutral and reverse. This facilitates the shifting of the transmission. It also provides for a more easily located neutral position. A set of spring loaded pins 57 project into this pocket 56 from the backside of the bevel gear 55. (The springs 60 for these pins 57 extend from within holes 61 in a backing plate 62 into holes 58 within the pins 57. A collar 59 on each pin 57 keeps the pins 57 within the holes 61.)

The shift collar 65 is located between the two bevel gears 55. This collar 65 has a series of holes 66 for driving connection with the pins 57 and an outer circumferential groove 67 for selective movement of the shift collar 65 via the shift lever 34. The collar 65 is drivingly connected to the input shaft 51 via a splined connection 70. This spline connection 70 allows the axial sliding of the collar 65 along the longitudinal axis of the input shaft 51 while also locking the shaft 51 to the collar 65 for rotation therewith. A "C" shaped shift pawl 71 extending off of the shift lever 34 at the joint between the two sections 20, 21 of the housing 11 surrounds the shift collar 65. The pawl 71 has two pins (not shown) extending into the outer circumferential groove 67 of the collar 65 at the top and bottom thereof so as to allow the selective movement of the shift lever 34 to shift the shift collar 65 into engagement with the pins 57 of either of the bevel gears 55. This provides for forward and reverse speeds in the transmission 10. Spring loaded detents (not shown) on both the shift lever 34 and shift collar 65 retain the shift collar 65 in its selected position. Note that if an extending end 110 of the shaft 51 was used as a horizontal input from the engine, then forward and reverse could be provided by incorporating a chain drive connection between shaft 51 and 52 on the right side of the housing 11 (unused in the figures of the application) with a modified shift collar 65 connecting either the counter rotating gears of the left side or the similar direction chain of the right side to the shaft 51 (i.e. eliminating parts 49, 50, 54 and 55) or otherwise as desired.

The intermediate shaft 52 is utilized to reduce the rotational speed of the input from the engine. In the double reduction combination shown a small gear 75 on the input shaft 51 drives a large gear 76 on the intermediate shaft 52 with a small gear 77 on the intermediate shaft 52 in turn driving the ring gear 78 of the differential shaft 53. The gear combination 75-76 is preferably on the same side of the housing 11 as the brake assembly 36 braking shaft 51. This provides for the most efficient transfer of braking forces. If the designer dictates, however, the brake assembly 36 could be located on either side of the housing 11 (and braking any shaft). Two sleeve bearing supports 80 provide additional bearing support for the center of the intermediate shaft 52. In the preferred embodiment shown these bearing supports 80 are paired on opposite sides of the gear 77.

The differential shaft 53 connects the drive to the output axles 85, 86 of the transmission 10. The differential 87 includes a ring gear 78 bolted between two mirror image half shafts assemblies by bolts 88. The ring gear 78 is drivingly connected to the pinion shafts 89 with a surrounding bearing support to the axle shafts 85, 86 via the differential case members 90, 91. Bevel gears 92 on the pinion shafts 89 drivingly engage the bevel gears 93, 94 on the axle shafts 85, 86 to provide the rotation thereof upon the application of torque to the ring gear 78.

The embodiment of the invention disclosed is mirror image in both lateral and longitudinal planes with the exception of the gears 75, 76 and the brake assembly 36 (and if one wanted one could incorporate as second set of gears 75, 76 and brake assembly 36 on the right side of the housing 11—to handle increased power or otherwise). The brake assembly 36 and other components are also mounted without the need for any machining. The transmission is thus relatively inexpensive both in manufacture and in subsequent repair (approximately two thirds the number of individual pieces are needed than in a non-symmetrical transmission). In addition the ability to modify a single transmission casting to vary the brake position, the engine input position, the shift lever orientation, the internal gearing et al. greatly increases the utilization factor for the transmission—again with a minimum number of unique parts. The transmission casting design could also itself be changed to incorporate other shaft placements and gearing, not to mention using the slots and/or surfaces to mount components different than discussed in the preferred embodiment (for example using slots to mount the transmission housing to the frame or a shift lever dedent bracket to the transmission etc) without departing from my invention. Therefore, although this invention has been described in its preferred form it is to be understood that numerous changes may be made without departing from the invention as hereinafter claimed.

What is claimed is:

1. In a transmission having a brake assembly attached to a housing for selectively braking a rotary shaft, the housing having two sections joined by a parting line, the improvement comprising a first slot, said first slot being located in the housing, a second slot, said second slot being located in the housing, a first bolt, said first bolt having an enlarged head, said enlarged head of said first bolt being in said first slot spaced from the parting line of the housing, means to connect said brake assembly to said first bolt, a second bolt, said second bolt having an enlarged head, said enlarged head of said second bolt being in said second slot spaced from the parting line of the housing, and means to connect said brake assembly to said second bolt.

2. The improved transmission of claim 1 characterized in that said first slot having an axis, said axis of said first slot extending substantially perpendicular to the parting line, said second slot having an axis and said axis of said second slot extending substantially perpendicular to the parting line.

3. The improved transmission of claim 2 characterized in that said first slot having an opening, said opening of said first slot open away from the parting line, said second slot having an opening and said opening of said second slot open away from the parting line.

4. The improved transmission of claim 1 characterized in that said bolts have a diameter respectively, and said slots have a wall thickness respectively and said wall thickness of said slots being between 7 to 1.5 times said diameter of said bolts respectively.

5. The improved transmission of claim 1 characterized in that said bolts have a diameter respectively and said housing has a thickness alongside said enlarged heads of said bolts respectively and said thickness of said housing is 1.5 to 2 times said diameter of said bolts respectively.

6. The improved transmission of claim 2 characterized in said first slot having a width, said enlarged head of said first bolt having a width across flat sections, said width of said first slot being equal to said width of said enlarged head of said first bolt such that said first bolt can not rotate in said first slot, said second slot having a width, said enlarged head of said second bolt having a width across flat sections and said width of said second slot being equal to said width of said enlarged head of said second bolt such that said second bolt can not rotate in said second slot.

7. In a transmission having a brake assembly attached to a housing for selectively braking a rotary shaft, the housing having two sections joined by a parting line, the improvement comprising a first slot, said first slot being located in one section of the housing, said first slot having an axis and an end, said axis of said first slot extending substantially perpendicular to the parting line with said end of said first slot being spaced from the parting line, a second slot, said second slot being located in the other section of the housing, said second slot having an axis and an end, said axis of said second slot extending substantially perpendicular to the parting line with said end of said second second slot being spaced from the parting line, a first bolt, said first bolt having an enlarged head, said enlarged head of said first bolt being in said first slot substantially at the end thereof spaced from the parting line, means to connect said brake assembly to said first bolt, a second bolt, said second bolt having an enlarged head, said enlarged head of said second bolt being in said second slot substantially at the end thereof spaced from the parting line, and means to connect said brake assembly to said second bolt.

8. The improved transmission of claim 7 characterized in that said first slot having an opening, said opening of said first slot open away from the parting line, said second slot having an opening and said opening of said second slot open away from the parting line.

9. The improved transmission of claim 7 characterized in that said first slot having a width, said enlarged head of said first bolt having a width across flat sections, said width of said first slot being equal to said width of said enlarged head of said first bolt such that said first bolt can not rotate in said first slot, said second slot having a width, said enlarged head of said second bolt having a width across flat sections, and said width of said second slot being equal to said width of said enlarged head of said second bolt such that said second bolt can not rotate in said second slot.

10. The improved transmission of claim 9 characterized in that said first bolt and said second bolt are hex head bolts having a multiplicity of available flat sections.

11. In a transmission having a brake assembly attached to a housing for selectively braking a rotary shaft, the housing having two sections joined by a parting line, the improvement comprising a first slot, said first slot being located in one section of the housing, said first slot having an axis, said axis of said first slot extending substantially perpendicular to the parting line, said first slot being spaced from the parting line, said first slot having an opening, said opening of said first slot open away from the parting line, said first slot having a width, a second slot, said second slot being located in the other section of the housing, said second slot having an axis, said axis of said second slot extending substantially perpendicular to the parting line spaced from the parting line, said second slot having an opening said opening of said second slot open away from the parting line spaced therefrom, said second slot having a width, a first bolt, said first bolt having an enlarged head, said enlarged head of said first bolt being in said first slot said second slot being spaced from the parting line, said enlarged head of said first bolt having a width across flat sections, said width of said first slot being equal to said width of said enlarged head of said first bolt such that said first bolt can not rotate in said first slot, means to connect said brake assembly to said first bolt, a second bolt, said second bolt having an enlarged head, said enlarged head of said second bolt being in said second slot, said enlarged head of said second bolt having a width across flat sections, said width of said second slot being equal to said width of said enlarged head of said second bolt such that said second bolt cannot rotate in said second slot.

12. The improved transmission of claim 11 characterized in that said bolts have a diameter respectively, and said slots have a wall thickness respectively and said wall thickness of said slots being between 0.7 to 1.5 times said diameter of said bolts respectively.

13. The improved transmission of claim 11 characterized in that said bolts have a diameter respectively and said housing has a thickness alongside said enlarged heads of said bolts respectively and said thickness of said housing is 1.5 to 2 times said diameter of said bolts respectively.

14. In a transmission having a brake assembly attached to a housing for selectively braking a rotary shaft, the housing having two sections joined by a parting line, the improvement comprising a first slot, said first slot being located in one section of the housing, said first slot having an axis, said axis of said first slot extending substantially perpendicular to the parting line, a second slot, said second slot being located in the other section of the housing, said second slot having an axis, said axis of said second slot extending substantially perpendicular to the parting line, a first bolt, said first bolt having an enlarged head, said enlarged head of said first bolt being in said first slot means to connect said brake assembly to said first bolt, a second bolt, said second bolt having an enlarged head, said enlarged head of said second bolt being in said second slot, means to connect said brake assembly to said second bolt, said enlarged head of said first bolt having a size, said first slot having an opening, said opening of said first slot being larger than said size of said enlarged head of said first bolt so as to allow the entrance of said enlarged head into said first slot, said enlarged head of said second bolt having a size, said second slot having an opening, said opening of said second slot being larger than said size of said enlarged head of said second bolt so as to allow the entrance of said enlarged head into said second slot, and said opening of said first slot and said opening of said second slot opening away from the parting line in respect to said respective slot.

15. The improved transmission of claim 14 characterized in that two sections of the housing are substantially identical.

* * * * *